US011041933B2

(12) United States Patent
Kumar et al.

(10) Patent No.: US 11,041,933 B2
(45) Date of Patent: Jun. 22, 2021

(54) LOCALIZATION BASED ON NETWORK OF WIRELESS NODES

(71) Applicant: SIGNIFY HOLDING B.V., Eindhoven (NL)

(72) Inventors: Sandeep Shankaran Kumar, Waalre (NL); Ashish Vijay Pandharipande, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 154 days.

(21) Appl. No.: 15/318,454

(22) PCT Filed: Jun. 9, 2015

(86) PCT No.: PCT/EP2015/062754
§ 371 (c)(1),
(2) Date: Dec. 13, 2016

(87) PCT Pub. No.: WO2015/189161
PCT Pub. Date: Dec. 17, 2015

(65) Prior Publication Data
US 2018/0219869 A1 Aug. 2, 2018

(30) Foreign Application Priority Data
Jun. 13, 2014 (EP) .................................... 14172359

(51) Int. Cl.
*H04L 29/06* (2006.01)
*G01S 1/68* (2006.01)
(Continued)

(52) U.S. Cl.
CPC .............. *G01S 1/68* (2013.01); *G01S 5/0226* (2013.01); *G01S 5/0236* (2013.01);
(Continued)

(58) Field of Classification Search
CPC .. H04L 63/107; H04L 9/0825; H04W 64/003; H04W 4/025; H04W 12/12;
(Continued)

(56) References Cited

U.S. PATENT DOCUMENTS 7,286,835 B1 * 10/2007 Dietrich ................ H04W 64/00
455/456.1
7,440,434 B2 * 10/2008 Chaskar ............ H04W 12/1202
370/338
(Continued)

FOREIGN PATENT DOCUMENTS

| JP | 2005535188 A | 11/2005 |
|---|---|---|
| JP | 2013207593 A | 10/2013 |
| WO | 2014066091 A2 | 5/2014 |

OTHER PUBLICATIONS

Liu, Hui, et al, "Survey of Wireless Indoor Positioning Techniques and Systems," IEEE Transactions on Systems, MAN, and Cybernetics—Part C: Applications and Reviews, vol. 37, No. 6, Nov. 2007 (14 Pages).

*Primary Examiner* — David Garcia Cervetti (57) ABSTRACT

A wireless node for use in a network of wireless nodes, for performing a localization to determine a location of a mobile device based on respective beacon signals transmitted wirelessly between the mobile device and each of a plurality of the wireless nodes. The first wireless node is configured to: wirelessly transmit or receive the respective beacon signal for use in determining the location of the mobile device; and wirelessly transmit information vouching for one or more others of the wireless nodes as being trusted for use in the localization. This information is transmitted to a device performing the localization (e.g. the mobile device), for use in identifying one or more rogue versions of said wireless nodes.

20 Claims, 3 Drawing Sheets

(51) Int. Cl.
   *H04W 64/00*   (2009.01)
   *G01S 5/02*    (2010.01)
   *H04W 12/122*  (2021.01)
   *H04L 9/08*    (2006.01)
   *H04W 4/02*    (2018.01)

(52) U.S. Cl.
   CPC .......... *H04L 9/0825* (2013.01); *H04L 63/107* (2013.01); *H04W 4/025* (2013.01); *H04W 12/122* (2021.01); *H04W 64/00* (2013.01); *H04W 64/003* (2013.01)

(58) Field of Classification Search
   CPC ............ H04W 64/00; H04W 12/1202; H04W 12/1204; H04W 12/00503; H04W 4/80; H04W 64/006; H04W 4/02; H04W 4/029; H04W 4/023; G01S 5/0226; G01S 1/68; G01S 5/0236; G01S 5/14
   See application file for complete search history.

(56) References Cited

U.S. PATENT DOCUMENTS

| | | | | |
|---|---|---|---|---|
| 7,633,909 | B1* | 12/2009 | Jones | H04W 12/0808 370/338 |
| 7,808,958 | B1 | 10/2010 | Hernacki et al. | |
| 7,852,205 | B2 | 12/2010 | Huseth et al. | |
| 7,966,021 | B2 | 6/2011 | Dietrich et al. | |
| 7,970,894 | B1* | 6/2011 | Patwardhan | H04W 12/12 709/224 |
| 9,155,125 | B1* | 10/2015 | Xue | H04W 12/10 |
| 9,256,742 | B2* | 2/2016 | Raghuram | G06F 21/57 |
| 9,350,717 | B1* | 5/2016 | Siddiqui | H04W 4/80 |
| 9,774,602 | B2* | 9/2017 | Raghuram | G06F 21/44 |
| 9,894,052 | B2* | 2/2018 | Siddiqui | H04W 12/06 |
| 10,027,678 | B1* | 7/2018 | Brandwine | G06F 11/3051 |
| 2003/0115267 | A1* | 6/2003 | Hinton | H04L 63/0815 709/204 |
| 2005/0132202 | A1* | 6/2005 | Dillaway | H04L 9/3226 713/179 |
| 2005/0259611 | A1* | 11/2005 | Bhagwat | H04L 63/1416 370/328 |
| 2005/0261004 | A1* | 11/2005 | Dietrich | G01S 5/02 455/456.2 |
| 2006/0046744 | A1* | 3/2006 | Dublish | H04L 63/0442 455/456.3 |
| 2006/0153153 | A1* | 7/2006 | Bhagwat | H04K 3/94 370/338 |
| 2006/0193300 | A1* | 8/2006 | Rawat | H04W 16/18 370/338 |
| 2006/0194568 | A1* | 8/2006 | Sharony | G01S 5/0252 455/410 |
| 2007/0008922 | A1* | 1/2007 | Abhishek | H04W 72/02 370/329 |
| 2007/0155403 | A1* | 7/2007 | Bishop | H04L 63/10 455/456.1 |
| 2008/0022089 | A1* | 1/2008 | Leedom | H04L 9/0869 713/156 |
| 2008/0107065 | A1* | 5/2008 | Lescuyer | H04L 63/1466 370/328 |
| 2009/0070582 | A1* | 3/2009 | Aura | H04L 9/3265 713/168 |
| 2009/0100260 | A1* | 4/2009 | Govindarajan | H04L 9/0872 713/155 |
| 2009/0113530 | A1* | 4/2009 | Brainard | G06F 21/31 726/6 |
| 2010/0142709 | A1* | 6/2010 | Robert | H04L 63/1441 380/270 |
| 2010/0205316 | A1* | 8/2010 | Xue | H04L 63/107 709/229 |
| 2011/0109508 | A1* | 5/2011 | Wolman | G01S 5/0205 342/451 |
| 2011/0138443 | A1* | 6/2011 | Gerard | H04L 63/107 726/2 |
| 2011/0173230 | A1* | 7/2011 | Winterbottom | H04W 4/029 707/770 |
| 2011/0179158 | A1* | 7/2011 | Donnelly | H04L 67/18 709/224 |
| 2011/0289004 | A1* | 11/2011 | Prakash | G06Q 20/223 705/71 |
| 2011/0313779 | A1* | 12/2011 | Herzog | G06Q 10/10 705/1.1 |
| 2012/0202459 | A1* | 8/2012 | Martell | H04W 8/18 455/410 |
| 2013/0045758 | A1* | 2/2013 | Khorashadi | H04W 4/50 455/456.3 |
| 2013/0117775 | A1* | 5/2013 | Perry, II | H04W 4/06 725/14 |
| 2013/0198797 | A1* | 8/2013 | Raghuram | G06F 21/57 726/1 |
| 2014/0059665 | A1* | 2/2014 | Albani | H04L 9/3228 726/7 |
| 2014/0073355 | A1* | 3/2014 | Ward | H04W 4/029 455/456.2 |
| 2014/0109191 | A1* | 4/2014 | Raghuram | H04L 63/0884 726/4 |
| 2014/0136328 | A1* | 5/2014 | Abhyanker | G06Q 10/087 705/14.58 |
| 2014/0188657 | A1* | 7/2014 | Patterson | G06Q 30/0631 705/26.7 |
| 2014/0200025 | A1* | 7/2014 | Wouhavbi | H04W 64/00 455/456.1 |
| 2014/0250511 | A1* | 9/2014 | Kendall | H04W 12/0027 726/6 |
| 2014/0289833 | A1* | 9/2014 | Briceno | H04L 63/08 726/7 |
| 2014/0325615 | A1* | 10/2014 | Scahill | H04L 63/1433 726/4 |
| 2015/0003433 | A1* | 1/2015 | Sinha | H04W 4/023 370/338 |
| 2015/0029220 | A1* | 1/2015 | Hittel | H04W 4/029 345/633 |
| 2015/0117234 | A1* | 4/2015 | Raman | H04L 43/0829 370/252 |
| 2015/0281888 | A1* | 10/2015 | Muttik | H04L 9/3247 455/456.1 |
| 2015/0334569 | A1* | 11/2015 | Rangarajan | H04W 12/1202 726/4 |
| 2015/0334676 | A1* | 11/2015 | Hart | H04W 64/003 455/456.1 |
| 2016/0050529 | A1* | 2/2016 | Hassan | H04L 67/42 709/203 |
| 2016/0132851 | A1* | 5/2016 | Desai | G06Q 20/202 705/21 |
| 2016/0134636 | A1* | 5/2016 | Raghuram | G06F 9/45558 726/4 |
| 2016/0164853 | A1* | 6/2016 | Bifulco | H04L 63/0823 726/7 |
| 2016/0205746 | A1 | 7/2016 | Kumar et al. | |
| 2016/0269385 | A1* | 9/2016 | Siddiqui | H04W 12/06 |
| 2016/0327629 | A1* | 11/2016 | Pandharipande | G01S 5/0236 |
| 2017/0127373 | A1* | 5/2017 | Deshpande | H04W 12/0609 |
| 2018/0167376 | A1* | 6/2018 | Siddiqui | H04W 12/06 |

\* cited by examiner

LOCALIZATION BASED ON NETWORK OF WIRELESS NODES

CROSS-REFERENCE TO PRIOR APPLICATIONS

This application is the U.S. National Phase application under 35 U.S.C. § 371 of International Application No. PCT/EP2015/062754, filed on Jun. 9, 2015, which claims the benefit of European Patent Application No. 14172359.3, filed on Jun. 13, 2014. These applications are hereby incorporated by reference herein.

TECHNICAL FIELD

The present disclosure relates to the identification of rogue nodes in a network of wireless reference nodes emitting beacon signals used for localization.

BACKGROUND

In an indoor positioning system, the location of a wireless device such as a mobile user terminal can be determined with respect to a location network comprising multiple anchor nodes, sometimes also referred to as beacon nodes or reference nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration or triangulation. Given the relative location of the mobile terminal and the known locations of the anchor nodes, this in turn allows the location of the mobile device to be determined in more absolute terms, e.g. relative to the globe or a map or floorplan.

Another localization technique is to determine the location of mobile device based on a "fingerprint" of a known environment. The fingerprint comprises a set of data points each corresponding to a respective one of a plurality of locations in the environment in question. Each data point is generated during a training phase by taking a measurement of the signals received from any reference nodes that can be heard at the respective location (e.g. a measure of signal strength such as RSSI) and storing this in a location server along with the coordinates of the respective location. The data point is stored along with other such data points in order to build up a fingerprint of the signal measurements as experienced at various locations within the environment. Once deployed, the signals measurements stored in the fingerprint can then be compared with signal measurements currently experienced by a mobile user device whose location is desired to be known, in order to estimate the location of the mobile device relative to the corresponding coordinates of the points in the fingerprint. For example this may be done by approximating that the device is located at the coordinates of the data point having the closest matching signal measurements, or by interpolating between the coordinates of a subset of the data points having signal measurements most closely matching those currently experienced by the device. The fingerprint can be pre-trained in a dedicated training phase before the fingerprint is deployed by systematically placing a test device at various different locations in the environment. Alternatively or additionally, the fingerprint can built up dynamically by receiving submissions of signal measurements experienced by the actual devices of actual users in an ongoing training phase.

As well as indoor positioning, other types of positioning system are also known, such as GPS or other satellite-based positioning systems in which a network of satellites acts as the reference nodes. Given signal measurements from a plurality of satellites and knowledge of those satellites' positions, the location of the mobile device may be determined based on similar principles.

The determination of the mobile device's location may be performed according to a "device-centric" approach or a "network-centric" approach. According to a device centric approach, each reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network. Other examples of location based services or functionality include indoor navigation, location-based advertising, service alerts or provision of other location-related information, user tracking, asset tracking, or taking payment of road tolls or other location dependent payments.

SUMMARY

Location-based services are emerging rapidly and are expected to have a great impact. However, newly emerging positioning techniques such as those based on Wi-Fi, ZigBee or Bluetooth are more prone to spoofing by rogue beacon or anchor nodes. The reliability and authenticity of location based services depends on the ability to calculate a device's true position even in the presence of such rogue nodes. The following provides techniques for identifying and overcoming the presence of rogue nodes so that the true location of a mobile device may be calculated with a certain assurance, or at least to detect attempts to hinder localization by rogue nodes. This is achieved by configuring one or more other wireless reference nodes, in addition to their primary function of beaconing, to wirelessly transmit (e.g. broadcast) information vouching for other nodes they know or trust.

According to one aspect disclosed herein, there is provided first wireless node for use in a network of wireless nodes, for performing a localization to determine a location of a mobile device based on respective beacon signals transmitted wirelessly between the mobile device and each of a plurality of the wireless nodes. The first wireless node is configured to wirelessly transmit or receive the respective beacon signal for use in determining the location of the mobile device. Further, the first wireless node is configured to wirelessly transmit information vouching for one or more others of the wireless nodes, i.e. identifying these one or more other nodes as being trusted for use in the localization. This information is transmitted to a device performing the localization, for use in identifying one or more rogue versions of said wireless nodes.

The information vouching for the one or more other nodes may be transmitted on the same channel as used to transmit or receive the beacon signal (e.g. a local RF channel using a technology such as Wi-Fi, ZigBee or Bluetooth).

Alternatively, in embodiments, the information vouching for the one or more other nodes may be transmitted "out-of-band", i.e. on an alternative channel. That is, the first node comprises a first interface configured to transmit or receive the respective beacon signal on a first wireless channel, and a second interface configured to transmit said information vouching for the other wireless nodes on a second channel different than the first channel. The first and second interfaces may be different physical interfaces or may share some or all of the same physical front-end hardware, but either way are configured to transmit on two distinct channels wherein either: (a) the second channel is on a different frequency than the first channel, (b) the second channel uses a different radio access technology than the first channel, and/or (c) the second channel uses a different medium than the first channel (i.e. different types of carrier, e.g. different regions of the electromagnetic spectrum, or even different types or radiation). Thus, although an attacker may spoof location signals on the first channel, the attacker may find it more difficult or costly to introduce the alternative technology used for the second channel into the environment in question (e.g. it would require different equipment, different skills and/or more time); or the attacker may even be unaware of the second channel's existence in the environment. Hence the second channel may provide an additional degree of trust when performing localization.

If the second channel is used, preferably it uses a technology requiring a line-of-sight between the mobile device and the first wireless node (while the first channel does not necessarily), or the second channel is substantially shorter range than the first channel (requires immediate physical proximity between the mobile device and the second wireless node, while the first channel does not). In such embodiments, the visual or physical proximity provides an additional degree of trust (e.g. to spoof the second channel would require equipment to introduced be into locations that are difficult for the attacker to access or where it would be difficult to reliably conceal the equipment).

In embodiments the first channel may be a radio channel, e.g. using Wi-Fi, ZigBee or Bluetooth. The information identifying the vouched-for other node(s) may be transmitted on this same first channel, or on an alternative second channel. E.g. at least the first node may be incorporated with a respective luminaire and the second channel may use coded light embedded in illumination emitted by the luminaire. Alternatively the second channel may use a near-field radio technology (such as used in RFID tags or the like), incorporated into a node disposed at a convenient place in the environment such that the user can touch or swipe it with his or her mobile device.

Regardless of the channel over which the vouching is implemented, in embodiments the first wireless node may vouch for all the other nodes in the network, or may vouch for only subset of the wireless nodes that are trusted and within a predetermined proximity of said first node. E.g. the subset may comprise ones of the wireless nodes that are trusted and within a predetermined proximity along a predicted navigation path of the mobile device.

In embodiments, each of the nodes or at least some of the nodes are configured in a similar manner to the first node.

The techniques may be applied in either a device centric, network centric or assisted scenario. Hence in embodiments the device performing the localization is the mobile device which receives said information via a receiver of the mobile device, or the device performing the localization is a location server which receives said information via a second one of said wireless nodes or via the mobile device.

In embodiments where the second channel is used, this may be for the sole purpose of the vouching, or alternatively the second channel may be also used for one or more additional purposes. For example in a device centric case, or an assisted case where the location server receives information via the mobile device; then as well as transmitting the information vouching for the one or more other nodes, the first wireless node may additionally use the second channel to transmit an identifier (e.g. SSID) of the network to be used to perform the localization, which the mobile device may require to identify or connect to the relevant nodes). Alternatively or additionally, as another example, the first wireless node may additionally use the second channel to transmit a location of the first wireless node. The first node's location may then be used by the mobile device or location server to verify said localization, i.e. the mobile device or location server can check whether the localization calculation performed using the beacon signals over the first channel is consistent with the location of the first node as reported over the second channel. And/or, the first node's location may be used to obtain an initial fix of the mobile devices' location before continuing to track the mobile device's location based on said localization. For instance if the second channel is implemented by an RF tag that the mobile device touches or swipes against, it can be assumed the mobile device's location is that of the first node; or if the first node is a luminaire and the second channel is based on coded light, it may be determined that the mobile device is approximately in the vicinity of that luminaire (e.g. standing beneath it) when receiving the coded light.

In embodiments where the vouching information is sent on the same, first channel as the beacon signal; a second channel of the kind discussed above may optionally still be used for another purpose such as for authenticating the information sent on the first channel. In this case, the information vouching for the one or more other nodes is transmitted by the first wireless node in a form that is encrypted or signed with a digital signature, and the first wireless node is configured to use the second channel to make available a public key for decrypting the encryption or a certificate for verifying the digital signature on the second channel.

According to another aspect disclosed herein, there is provided a mobile device for use in a network of wireless nodes, for performing a localization to determine a location of the mobile device based on respective beacon signals transmitted wirelessly between the mobile device and each of a plurality of the wireless nodes. The mobile device comprises one or more wireless interfaces configured to wirelessly transmit or receive the respective beacon signals for use in determining the location of the mobile device, and to wirelessly receive information from a first one of the wireless nodes vouching for one or more others of the wireless nodes as being trusted for use in said localization. The mobile device further comprises a location module configured to perform said localization, and a security module configured to identify one or more rogue versions of said wireless nodes based on said information.

According to a further aspect disclosed herein, there is provided a system comprising a network of wireless nodes, for performing a localization to determine a location of a mobile device based on respective beacon signals transmitted wirelessly between the mobile device and each of a plurality of the wireless nodes. The system further comprises the mobile device and/or a location server. Each of the wireless nodes is configured to wirelessly transmit a respective report vouching for one or more others of the wireless nodes as being trusted for use in said localization, and either the mobile device is configured to receive one or more of said reports via a receiver of the mobile device, or the location server is configured to receive the reports via at least one receiving one of said wireless nodes. Further, the mobile device or location server comprises a location module configured to perform said localization, and a security module configured to identify one or more rogue versions of said wireless nodes based on said information.

In embodiments, the security module is configured to exclude the identified rogue nodes from use in said localization, or given them a lower weighting compared to any vouched-for nodes that are used. Alternatively or additionally, the security module may be configured to report the identified rogue nodes to a location server or other administrative entity (a terminal or server of an administrator or operator).

In further embodiments, the system comprises a transmitter arranged to transmit to the mobile device over a second channel of the kind discussed above, and this second channel may be used to provide additional functionality to support the localization. This transmitter could be implemented in one of the wireless nodes; or could be a separate transmitter placed at a convenient point in the environment such as an entry point to the room, building or other zone in which said wireless nodes are disposed, such that the mobile device can receive the transmission over the second channel when (and preferably only when) it passes the entry point. For example the second channel may be implemented by an RF tag disposed at an entrance to the room, building or zone, so that the user can swipe or touch his or her device against the tag upon entry; or may be implemented by a luminaire emitting coded light near the entrance.

For instance, such a second channel may be used to transmit an initial report vouching for an initial group of said wireless nodes. In a device centric case where the location module is comprised in the mobile device, or in an assisted case where the location module is comprised in the location server but receives the initial report via the mobile device, then the location module can ensure that the first time it performs a localization in a given environment it only uses the respective beacon signals of ones of those wireless nodes that are vouched for in the initial report. E.g. the mobile device receives the initial list of trusted nodes when it first enters a room, building or zone; and from that point onward this creates a chain of trust each time it performs a localization operation in that room, building or zone (each time only using nodes that have been vouched for by the initial report or other, previously vouched-for nodes).

Alternatively or additionally, in another example, the respective vouching reports from the wireless nodes are transmitted on the same, first channel as the beacon signals; and these reports are transmitted by each of the wireless nodes in a form that is encrypted or signed with a digital signature. In such an arrangement, the second channel may be configured to transmit a public key for decrypting the encryption or a certificate for verifying the digital signature. In a device centric case where the security module is comprised in the mobile device, or in an assisted case where the security module is comprised in the location server but receives the public key or certificate via the mobile device, then the security module can use the public key or certificate as received over the second channel to decrypt the encryption or verify the digital signature respectively. E.g. the mobile device receives the certificate or key when it first enters a room, building or other zone; and from that point onwards it can trust any signed reports from nodes in the room, building or zone.

According to a further aspect disclosed herein, there is provided a computer program product for performing a localization to determine a location of a mobile device based on measurements of a respective beacon signal transmitted wirelessly between the mobile device and each of a plurality of the wireless nodes in a network of wireless nodes. The computer-program product comprises code embodied on at least one computer-readable medium, and configured so as when retrieved and/or downloaded and executed on one or more processors to perform operations of the first node, mobile device or location server in accordance with any of the embodiments herein.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF PREFERRED EMBODIMENTS

Figure 1:
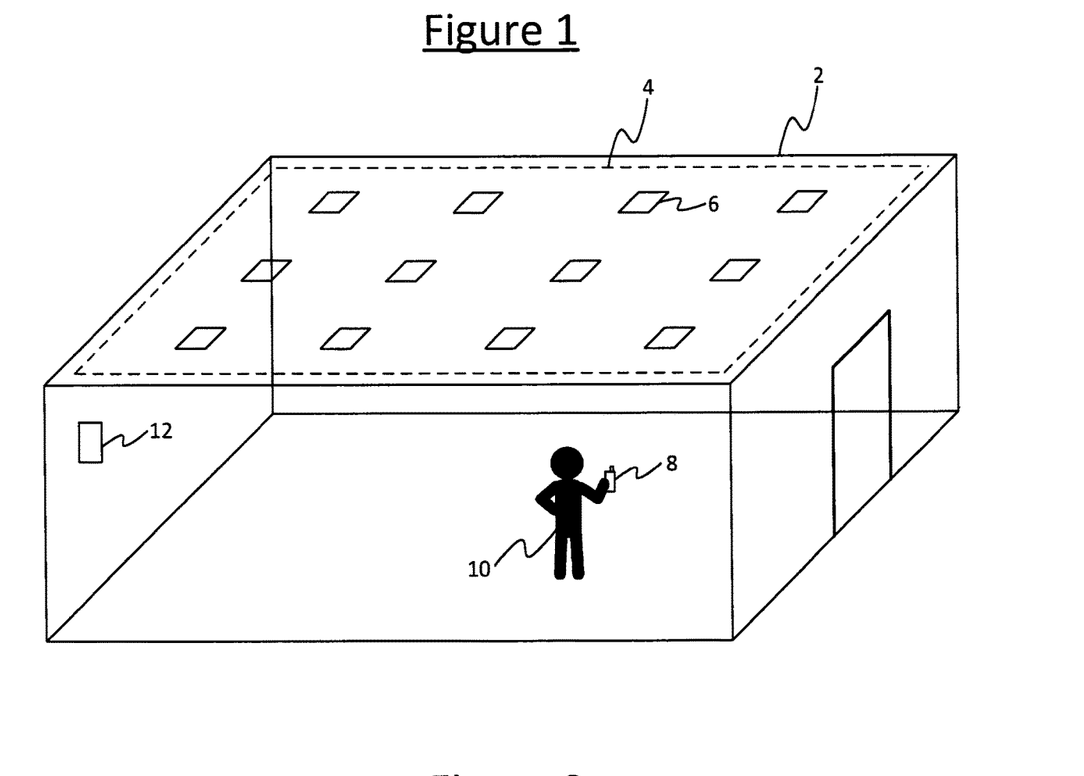
FIG. 1 is a schematic representation of an environment comprising an indoor positioning system.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations or be dedicated anchor nodes of an indoor positioning system, as long as their locations can still be known. For example the reference nodes could instead be access points 12 of a WLAN or base stations of a cellular network used for a secondary purpose of positioning, or could be other mobile devices that have already been, or even satellites of a satellite based positioning system. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12, being or object about which it is disposed.

Figure 2:
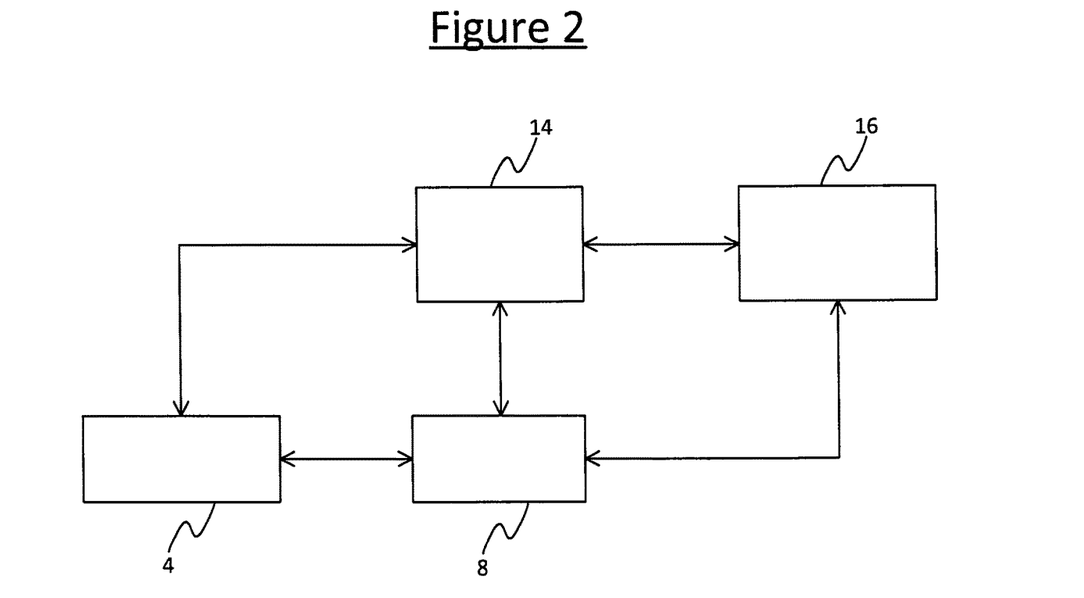
FIG. 2 is a schematic block diagram of a system for providing a location based service.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2.

The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi, Zigbee or Bluetooth, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi, Zigbee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi, Zigbee or Bluetooth, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location.

In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In an example of a hybrid approach, the nodes 6 may take the measurements but then send them to the mobile device 8, or the mobile device 8 may take the measurements but send them to the location server 14.

There are various options for the manner in which such measurements are started and conducted. For example, either the mobile device may initiate the transmission upon which the measurement is based, or the network may initiate the transmission. Both are possible, but it may have some impact how the rest of the process is implemented, in particular for time-of-flight measurements.

Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (time or time+date) of transmission to the message. If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement node 6 via another channel (e.g. via location server 14).

Any one or a combination of these approaches or others may be applied in conjunction with the system disclosed herein. Whatever approach is chosen, once such a signal measurement is available from or at each of a plurality of the anchor nodes 6, it is then possible to determine the location of the mobile device 8 relative to the location network 4 using a technique such as trilateration, multilateration, triangulation and/or a fingerprint based technique.

In addition, the "absolute" locations of the anchor nodes 6 (or more generally reference nodes) are known, for example from a location database maintained by the location server 14, or by the respective location of each anchor node 6 being stored at the node itself (e.g. and communicated from each relevant nodes to the mobile device 8 in a device centric approach). The absolute location is a physical location of the node in physical environment or framework, being known for example in terms of a geographic location such as the location on a globe or a map, or a location on a floorplan of a building or complex, or any real-world frame of reference.

By combining the relative location of the mobile device 8 with the known locations of the anchor nodes 6 used in the calculation, it is then possible to determine the "absolute" location of the mobile device 8. Again the absolute location is a physical location of the device in physical environment or framework, for example a geographic location in terms of the location on a globe or a map, or a location on a floorplan of a building or complex, or any more meaningful real-world frame of reference having a wider meaning than simply knowing the location relative to the location network 4 alone.

In embodiments, the absolute location of the nodes 6 may be stored in a human understandable form and/or the absolute location of the mobile device 8 may be output in a human understandable form. For example, this may enable the user 10 to be provided with a meaningful indication of his or her location, and/or may enable the administrator of a location-based service to define rules for granting or prohibiting access to the service or aspects of the service. Alternatively it is possible for the location of the nodes 6 and/or mobile device 8 to only ever be expressed in computer-readable form, e.g. to be used internally within the logic of the location based service.

In other embodiments it is not excluded that the location is only ever expressed relative to the location network 4, 6 and not as a more meaningful "absolute" location. For example if each anchor node 6 is integrated or co-located with a respective luminaire and the location is being determined for the purpose of controlling those luminaires, then in some embodiments it may only be necessary to determine the user's location relative to the framework of points defined by the anchor nodes of these luminaires (though in other similar arrangements it may still be desired to define lighting control regions relative to the floorplan of a building or the like).

In a device centric approach the mobile device 8 looks up the locations of the relevant nodes 6 by querying the location server 14 (e.g. via the wireless access point 12), or alternatively may receive the respective location along with the signal from each node 6. The mobile device 8 then performs the calculation to determine its own location at the device 8 itself (relative to the location network 4 and/or in absolute terms). In a network centric approach on the other hand, the nodes 6 submit the signal measurements they took to the location server 14 (e.g. via the wireless access point 12), and the location server 14 performs the calculation of the device's location at the server 14 (again relative to the location network 4 and/or in absolute terms). In an example of an assisted or hybrid approach, the mobile device 8 may take the measurements of signals from the nodes 6 but submit them to the location server 14 in a raw or partially processed form for the calculation to be performed or completed there.

Typically a signal measurement is needed from at least three reference nodes, though if other information is taken into account then it is sometimes possible to eliminate impossible or unlikely solutions based on two nodes. For example, if the location is assumed to be constrained to a single level (e.g. ground level or a given floor of a building), the measurement from any one given node 6 defines a circle of points at which the mobile device 8 could be located. Two nodes give two circles, the intersection of which gives two possible points at which the mobile device 8 may be located. Three nodes and three circles are enough to give an unambiguous solution at the intersection of the three circles (though more may be used to improve accuracy). However, with only two nodes, sometimes it may be possible to discount one of those points as being an unlikely or impossible solution, e.g. being a point in an area to which the user 10 does not have access or it is impossible to reach, or a point that is not consistent with a plotted trajectory (path) of the user 10 (elimination by "dead reckoning"). Similar comments may be made in relation to three-dimensional positioning: strictly four nodes defining four spheres are required to obtain an unambiguous solution, but sometimes an estimate may be made based on fewer nodes if additional information can be invoked. Assuming the user 10 is constrained to a particular level to constrain to a two-dimensional problem is an example of such information. As another example, it may be assumed the user 10 is found on one of a plurality of discrete floors, and/or a dead reckoning type approach may be used to eliminate unlikely jumps in the user's route.

By whatever technique the location is determined, this location may then be used to assess whether the mobile device 8 is granted access to some location-based service or other such function. To this end, there is provided a service access system 16 configured to conditionally grant access to the service in dependence on the absolute location of the mobile device 8. In a device centric approach the mobile device 8 submits its determined absolute location (e.g. in terms of global coordinates, map coordinates or coordinates on a floor plan) to the service access system 16 over a connection via the wireless access point 12 or other means such as a cellular connection. The service access system 16 then assesses this location and grants the mobile device 8 with access to the service on condition that the location is consistent with provision of the service (and any other access rules that happens to be implemented, e.g. also verifying the identity of the user 10). In a network centric approach, the location server 14 submits the determined absolute location of the mobile device 8 to the service access system 16, e.g. via a connection over a local wired or wireless network and/or over a wide area network or internetwork such as the Internet. Alternatively the location server 14 may send the absolute location to the mobile device 8, and the mobile device may then forward it on to the service access system 16. In another alternative the service could be provided directly from the location server 14, or could even be implemented on an application running on the mobile device 8 itself.

The following are some examples of location-related services or functions that may be provided in accordance with embodiments of the present disclosure:

allowing control of a utility such as lighting from an application running on the mobile device 8, where the user can only control the lighting or utility in a given room or zone when found to be located in that room or zone, or perhaps an associated zone;

providing a navigation service such as an indoor navigation service to the mobile device 8 (in which case the location-related function comprises at least providing the device's absolute location to an application running on the mobile device 8, e.g. which the application may then use to display the user's location on a floor plan or map);

providing location based advertising, alerts or other information to the mobile device 8, e.g. providing the device 8 with information on exhibits as the user 10 walks about a museum, providing the device 8 with information about products as the user 10 walks about a shop or mall, providing the device 8 with access to medical data only if present inside a hospital or specific zone within a hospital, or providing the device 8 with access to complementary media material only if present physically within a movie theatre or the like; and/or accepting location dependent payments from the mobile device on condition that the device 8 is present in a certain region, e.g. payments in shops, payment of road tolls, "pay as you drive" car rental, or entrance fees to venues or attractions.

For instance, in embodiments the service access system 16 is configured to control access to a lighting network installed or otherwise disposed in the environment 2. In this case the environment 2 comprises a plurality of luminaires (not shown) and a lighting control system comprising the access system 16. The luminaires may for example be installed in the ceiling and/or walls, and/or may comprise one or more free standing units. The luminaires are arranged to receive lighting control commands from the controller. In embodiments this may also be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi or Zigbee. Alternatively the lighting controller may communicate with the luminaires by other means, e.g. a separate wired or wireless network. Either way, the access system 16 of the lighting controller is configured with one or more location dependent control policies. For example, a control policy may define that a user 10 can only use his or her mobile device 8 to control the lights in certain region such as a room only when found within that region or within a certain defined nearby region. As another example control policy, the mobile device 8 only controls those luminaires within a certain vicinity of the user's current location.

Note that FIG. 2 shows arrows in all directions to illustrate the possibility of either device centric or network centric approaches, but in any given implementation not all the communications shown need be bidirectional or indeed present at all. The techniques disclosed in the following may be applied in any of a device centric, network centric or assisted (hybrid) arrangement.

In a device centric scenario, the device 8 being positioned receives beacon signals from location network beaconing nodes 4 to calculate its position either at the positioned device itself or with the help of additional data from a location server 14. A problem is that an attacker could install their own rogue beacon or anchor node(s) into the location network 4 to spoof signals that are measured by the positioned device 8. This can lead to the positioned device 8 calculating a location for itself which is not true. Even in a network centric case, it is potentially possible that a malicious party could find a way to connect a rogue node to the network 4, which would report false measurements to the location server 14. E.g. one way that this could happen is if the interface between the anchor nodes 6 and the location server 14 is not authenticated or is hacked.

Such rogue nodes could be used by the attacker to either launch a denial-of-service (DoS) attack, or more sophisticated attacks whereby the attacker could trigger predetermined responses from the positioned device 8 and/or service access system 16. Some examples of such sophisticated attacks include (but are not limited to) triggering an alarm for assets that might be falsely detected as being outside their intended zone, navigating an automated driving vehicle in a warehouse in the wrong direction to cause damage, controlling lights erratically to cause distress or harm, or disruption of other location based services.

This following provides solutions to identify fake localization beacons and to provide assurances that any location that is calculated is the true location (to within a reasonable degree of certainty and accuracy).

Figure 3:
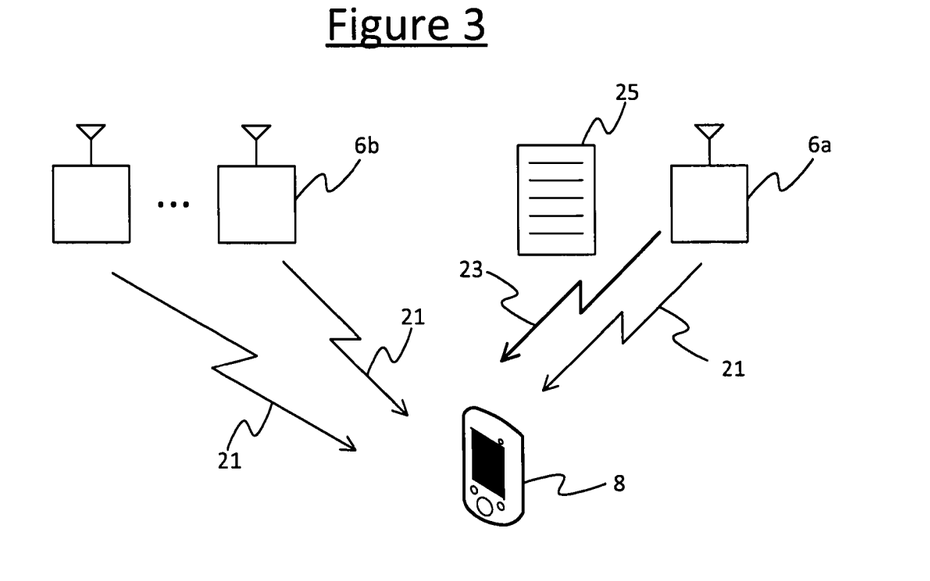
FIG. 3 is a schematic block diagram of system in which one node vouches for one or more others.

FIG. 3 shows an arrangement in which a first anchor node 6a is configured to vouch for one or more other anchor nodes 6b. Each of the first and other nodes 6a, 6b is configured to wirelessly transmit or receive a respective beacon signal on a first wireless channel 21, e.g. a local radio channel using a radio access technology such as Wi-Fi, ZigBee or Bluetooth, as already discussed above. In a device centric approach or certain hybrid approaches, the respective beacon signal is the signal transmitted from the respective node 6a, 6b. In a network centric approach or certain other hybrid approaches, the respective signal is a respective instance of the signal transmitted by the mobile device 8. In addition to the main beaconing functionality, at least the first node 6a is configured to wirelessly transmit information 25 vouching for one or more other nodes 6*b* as being known to the system. I.e. this information identifies one or more other nodes 6*b* which the first node 6*a* reports as being trusted for use in the localization.

In embodiments, the information 25 vouching for the vouched-for other nodes 6*b* is broadcast by the first node 6*a*, so that it can be received by any mobile devices 8 (network centric or hybrid) or second nodes 6 (network centric or hybrid) that happen to be in range.

The information 25 vouching for the other nodes 6*b* is preferably transmitted on a second, or "out-of-band" channel 23 which is different than the first wireless channel 21. This may be a channel using a different frequency, a different radio access technology, or a different medium (e.g. different type of radiation such as a different region of the EM spectrum). For example the first channel may be implemented using a short-range (unlicensed) radio access technology such as Wi-Fi, ZigBee or Bluetooth; while the second channel 23 may be implemented using coded light (visible spectrum communication), infrared, or a near-field communication (NFC) radio technology such as an RFID technology (as used in RFID tags). Examples will be discussed in more detail below.

Note that in embodiments, one or more other nodes 6, 6*b* may also be configured in a similar manner to the described first node 6*a*. This includes embodiments where the "first" node 6*a* may be one of the "other" nodes from the perspective of one or more of the "other" nodes (each of which is a "first" node from its own perspective), such that the nodes 6 are arranged to mutually vouch for each other in a network of trust.

As shown in FIG. 3, in a device centric or certain hybrid approaches, the information 25 vouching for the other nodes 6*b* is received and made use of by the mobile device 8. As well as performing the localization, the mobile device 8 is configured to process the information 25 to determine whether any of the anchor nodes 6 it is encountering in the environment 2 are not amongst those vouched for by the information 25 received from one or more first nodes 6*a*. Such unvouched-for nodes may thus be determined to be rogue nodes (with some degree of certainty, i.e. being at least suspected rogue nodes). There are at least two possible courses of action in response to detecting such rogue nodes. One option is for the mobile device 8 to refrain from using any nodes identified as rogue in the localization (i.e. refrain from using any beacon signals from the identified rogues), instead selecting only those vouched-for in the localization calculation (i.e. only using measurements of beacon signals to or from the vouched-for nodes, e.g. only including these in the triangulation, trilateration, multilateration or fingerprint-based calculation). Alternatively or additionally, the mobile device 8 may report the identified rogues to a location server 14 or other administrative computer system, so that an operator of the location network 6 can investigate further whether these are indeed rogues, and if so remove or nullify them.

In a network centric approach or certain other hybrid approaches (not shown in FIG. 3), the information 25 is received by one or more second nodes 6 of the location network and forwarded to a location server 14 to be used there. These second nodes could be nodes amongst those vouched for by the transmitted information 25, or could be yet further nodes of the network 6. Or as another option, the information 25 could be received by the mobile device 8 but forwarded to the location server 14 to be used there. In such cases, as well as performing the localization, the location server 14 is configured to process the information 25 to determine whether any of the anchor nodes 6 from which it has received beacon measurements are not amongst those vouched for by the information 25 received from one or more first nodes 6*a*. Such nodes may thus be determined to be rogue nodes (again with some degree of certainty, i.e. being at least suspected rogue nodes). As above, there are again two possible courses of action in response to detecting such rogue nodes: the location server 14 may refrain from using any nodes identified as rogue in the localization (i.e. refrain from using the respective beacon measurements), instead selecting only those vouched-for in the localization calculation (i.e. only using measurements of beacon signals to or from the vouched-for nodes); and/or the server 14 may record the identified rogues or report them to another administrative computer system, so that an operator of the location network 6 can investigate further whether these are indeed rogues, and if so remove or nullify them.

Figure 4:
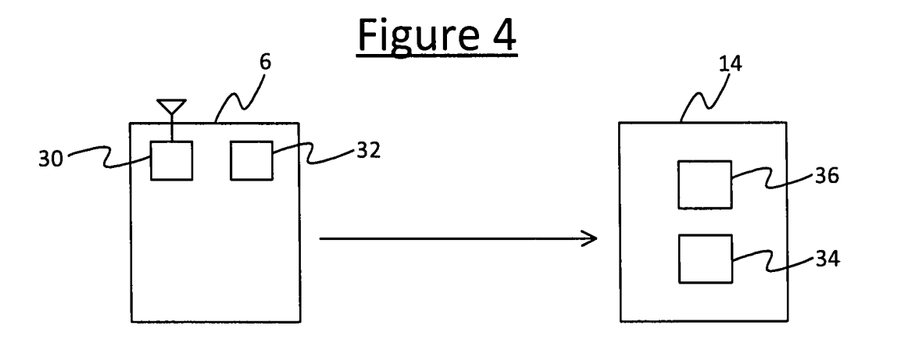
FIG. 4 is a schematic block diagram of a wireless reference node and location server.

FIG. 4 gives a block diagram of one of the anchor nodes 6 and the location server 14. The anchor node 6 comprises a first wireless interface 30 for transmitting or receiving the beacon signal on the first channel 21. In embodiments, the information 25 vouching for the one or more other anchor nodes 6 may also be transmitted on this same, first channel 21. Alternatively, the anchor node 6 may comprise a second wireless interface 32 for transmitting the vouching information 25 on a second channel 23. In the latter case, the second channel is distinct from the first channel in that either: (a) the second channel uses a different frequency than the first channel, (b) the second channel uses a different radio access technology than the first channel, and/or (c) the second channel uses a different medium than the first channel (i.e. different types of carrier, e.g. different regions of the electromagnetic spectrum, or even different types or radiation). Preferably the second channel uses a technology requiring a line-of-sight between the mobile device and the first wireless node (while the first channel does not necessarily), or the second channel is substantially shorter range than the first channel (requires immediate physical proximity between the mobile device and the second wireless node, while the first channel does not).

If the second channel 23 is used, the two interfaces 30, 32 may be two separate physical interfaces, e.g. the first interface 30 being a radio transmitter or receiver, and the second interface 32 being a coded light emitter or NFC transmitter (e.g. RFID tag). Alternatively the two interfaces 30, 32 could comprise the same physical interface, and be implemented as two logical interfaces, e.g. using different frequencies of the same radio access technology.

The anchor node 6 is also configured to communicate with the location server 14. In embodiments this communication may also be performed via the first interface 30, and the wireless access point 12; but that is not necessarily the case in all embodiments, e.g. a wired connection with the location server 14 could alternatively be used.

Figure 5:
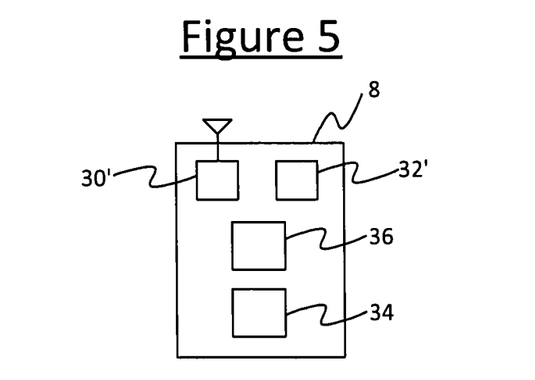
FIG. 5 is a schematic block diagram of a mobile terminal.

FIG. 5 gives a block diagram of the mobile device 8. The device 8 comprises a first wireless interface 30', and optionally a second wireless interface 32'. The first interface 30' is a complementary interface to the first interface 30 of the anchor nodes 6, for receiving the beacon signals from the anchor nodes 6, and in embodiments also the vouching information 25. If present, the second wireless interface 32' is a complementary interface to the second interface 32' of the anchor nodes 6, as an alternative means for receiving the vouching information 25. The two interfaces 30', 32' may again be two separate physical interfaces, e.g. the first interface 30' being a radio transmitter or receiver, and the second interface 32' being a coded light or NFC receiver. Alternatively the two interfaces 30, 32 could comprise the same physical interface, and be implemented as two logical interfaces, e.g. using different frequencies of the same radio access technology.

In embodiments, the first channel 21 uses a local radio technology such as Wi-Fi, ZigBee or Bluetooth; and the first interface 30, 30' is a radio transmitter or receiver for transmitting or receiving the respective beacon signal, and optionally the vouching information, over the first channel according to the local radio technology of the first channel.

If the vouching information 25 is instead transmitted over a separate, second channel 23 instead of the first channel, in embodiments the second channel takes the form of a near-field communication channel requiring immediate physical proximity between the two complementary sides 32, 32' of the second interface, and therefore between the anchor node 6 and the mobile device 8. Preferably this immediate physical proximity means less than or equal to 20 cm between the transmit and receiving interfaces 32, 32'; or less than or equal to 10 cm between the transmit and receiving interfaces 32, 32'; or less than or equal to two wavelengths of the second channel's carrier between the transmit and receiving interfaces 32, 32'; or less than or equal to one wavelength of the second channel's carrier between the transmit and receiving interfaces 32, 32'. For example, the second channel may be implemented with a near-field radio technology, e.g. the second interface 32 of the anchor node 6 taking the form of an RF tag and the second interface 32' of the mobile device 8 being configured to energize the RF tag 32 and receive the relevant signal back from the tag as a result.

In another example, at least one of the anchor nodes is incorporated into a respective luminaire, and the second channel is a coded light channel embedded into the light emitted by the luminaire. In this case the second interface 32 of the anchor node takes the form of a light source of the respective luminaire, and the second interface 32' on the mobile device 8 takes the form of a coded light detector such as a photocell or camera plus associated signal processing software or circuitry.

In a device centric or some hybrid approaches, the mobile device 8 comprises a location module 36 for performing the localization calculation based on the beacon signals from the anchor nodes 6 (according to techniques already discussed), and also a security module 34. The security module 34 is configured to process the information 25 received from one or more of the anchor nodes 6 vouching for one or more others of the nodes, and to act accordingly: either selecting only trusted nodes to be used in the localization by the localization module, and/or reporting rogue nodes to the location server 14.

In a network centric or other hybrid approaches, the localization module 36 and security module 34 are implemented at the location server 14. The following embodiments will be described in terms of a device centric approach, but it will be appreciated that corresponding techniques may be applied by analogy to a network centric or hybrid approach.

During the setup of the location network, each anchor node 6 is provided with identifiers of other anchor nodes 6 which are part of the trusted location network 4. This list of other anchor nodes in the location network is advertised in the report 25 transmitted by each anchor node 6 to the positioned device 8. I.e. the information 25 vouching for the other nodes 6b takes the form of a list of identifiers of those other nodes, identifying them as trusted for use in performing localization calculations based on their respective beacon signals. This may be referred to herein as the "vouching information", "vouching report" or simply the "list". The positioned device 8 uses this list to identify anchor nodes 6 that have been vouched for by each other and hence has an authentic list of anchor nodes to calculate the true location with certain assurance.

The list 25 may take any format that can be understood by the security module, e.g. plain text, XML or JSON. The node IDs in the list may be transmitted in "bare" (unencrypted) form, or to provide additional trust it could optionally be digitally signed or encrypted. The IDs could be MAC addresses or any other unique number that can be used to look up the position of the anchor nodes from an assistance data.

In another example, in a device centric case or an assisted case where the location server 14 receives the beacon signals via the mobile device 8, if the beacon signals are digitally signed then the list 25 transmitted by each node 6 may comprise a respective digital certificate for each of the other trusted nodes 6 (either in addition to the plain IDs of those nodes, or as the sole means of identification). The respective certificate can then be used by the security module 34 to authenticate the respective beacon signal of each of the vouched-for nodes 6.

In embodiments, the list 25 may additionally include an indication as to which location server or beacon group each of the identified nodes in the list belong to, which the location module 36 can use to decide which nodes to use in the location calculation.

In embodiments, the list 25 transmitted by each node 6 may vouch for all the other nodes 6 that are trusted in the system, or alternatively only a reduced set of anchor nodes is vouched for in the list (fewer than the total number in the network 4 in question). In the case of a reduced list, this subset may be based for example on: the indoor layout plan, the usual navigation patterns of the particular device 8 being localized, and/or patterns of normal use of devices in general in the space. Transmitting the identifiers of all other anchor nodes 6 in the location network 4 may only be viable in small location networks, as the list of identifiers can get large and can consume a large bandwidth if advertised from each anchor node. Therefore to overcome this, in embodiments the anchor nodes 6 may each only advertise a subset of the anchor nodes. This subset that each node 6a transmits is based on the location of other anchor nodes 6b within an indoor layout map or the like, or their position relative to the node 6a. I.e. an anchor node 6 transmits identities of only those (trusted) nodes within a certain vicinity and/or those that are required based on the layout (e.g. other anchor nodes in the same room).

For example, to enable a chain of anchor nodes that can trusted based on the overlap of anchor node lists advertised by different anchor nodes, a typical navigation path of positioned devices within the building may be predicted (e.g. based on a-priori information on expected user behavior and the building layout, or a known navigation path if the user has indicated his or her end point). This may then be used to identify overlapping anchor nodes that are to be advertised to obtain suitable coverage. In this case, the nodes 6 within the relevant vicinity of each respective node (and therefore the nodes to be advertised by that node) comprise only those nodes within a predetermined vicinity along the predicted navigation path.

As mentioned, there are also different possibilities for the response of the security module 34 in response to identifying one or more rogue nodes. One possible countermeasure is to selectively filter from the localization any signals from the beacon nodes that are judged, based on one or more of above the techniques, as not being part of the real location network 4. If a positioned device 8 detects signals from (supposed) anchor nodes that cannot be authenticated as being part of the location network 4, then its security module 34 can selectively filter those signals from the location calculations. The selective filtering may completely exclude signals from untrusted anchor nodes that are not vouched-for, or alternatively give them a lower weighting so that they do not influence the final location calculation beyond a certain degree.

Another possibility is that the security module 34 triggers an alert to the location server 14 or other entity (e.g. computer system of an administrator), altering it about the observance or suspicion of spoofed nodes based on one or more of the above techniques. Unlike the case where the positioned device 8 just filters out signals from the rogue nodes, in this variant the positioned device 8 takes active steps to inform one or more other entities of the presence of such rogue nodes.

In further embodiments, the vouching processes may be securely bootstrapped or cross-checked with the use of an alternative or "out-of-band" channel to the positioned device (e.g. a coded-light or RFID channel).

Figure 6:
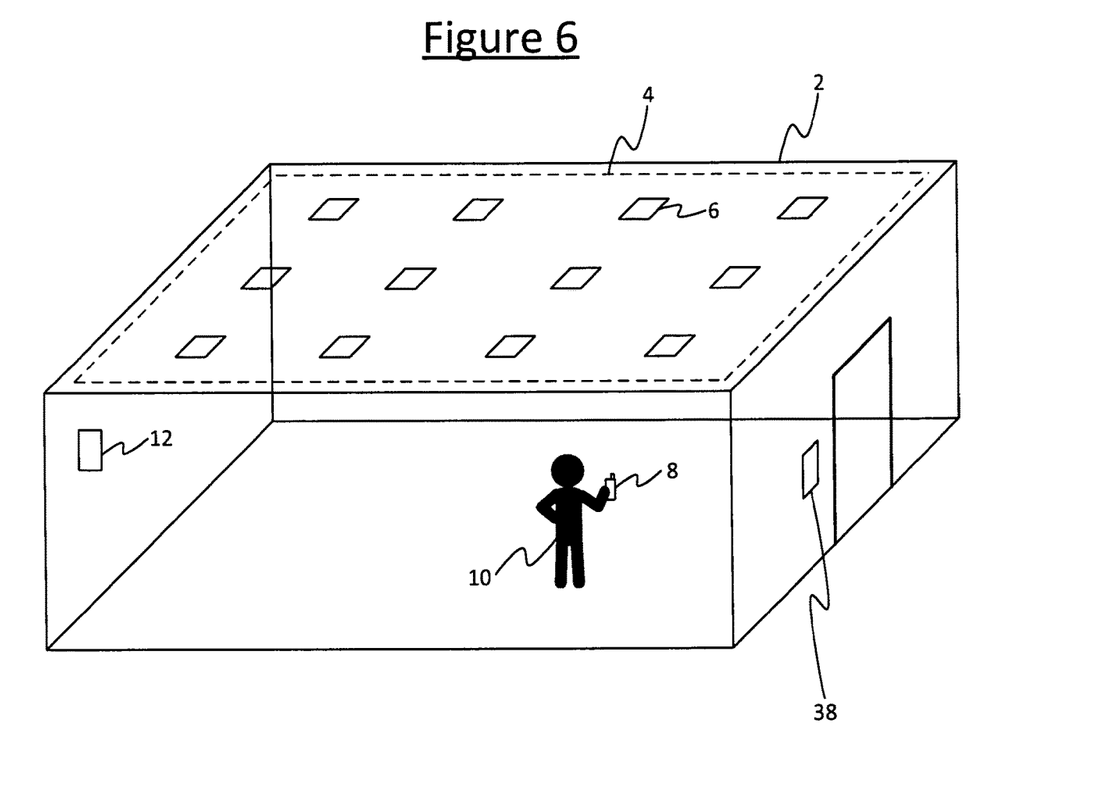
FIG. 6 is a schematic representation of an environment comprising an indoor positioning system and separate transmitter.

To implement this, the system comprises a transmitter configured to transmit to the mobile device 8 on a second channel other than the first channel used for the beacons signals. This transmitter may be incorporated into one or more of the anchor nodes 6, and if the vouching list 25 is transmitted on the second channel 23 rather than the first channel, this transmitter may be the same second wireless interface 32 used to transmit the vouching list 25, using the same second channel 23. Alternatively, as illustrated in FIG. 6, the transmitter now described may be separate transmitter 38 disposed at some convenient place in the environment 2 so that it can be read by the mobile device. In the latter case, the transmitter 38 may transmit on the same type of second channel as used by the anchor nodes 6 in some embodiments to transmit the vouching list 25, or the transmitter 38 may transmit on a different type of second channel.

Either way, the second channel now discussed is again distinct from the first channel used for the beacon signals in that either: (a) the second channel uses a different frequency than the first channel, (b) the second channel uses a different radio access technology than the first channel, and/or (c) the second channel uses a different medium than the first channel (i.e. different types of carrier, e.g. different regions of the electromagnetic spectrum, or even different types or radiation). Preferably the second channel uses a technology requiring a line-of-sight between the mobile device and the first wireless node (while the first channel does not necessarily), or the second channel is substantially shorter range than the first channel (requires immediate physical proximity between the mobile device and the second wireless node, while the first channel does not).

In one embodiment, this second channel again takes the form of a near-field communication channel requiring immediate physical proximity between the transmitter 38/32 and a complementary receiver 32' in the mobile device. Again, preferably this immediate physical proximity means less than or equal to 20 cm between the transmit and receiving interfaces 32, 32'; or less than or equal to 10 cm between the transmit and receiving interfaces 32, 32'; or less than or equal to two wavelengths of the second channel's carrier between the transmit and receiving interfaces 32, 32'; or less than or equal to one wavelength of the second channel's carrier between the transmit and receiving interfaces 32, 32'. For example, the second channel may be implemented with a near-field radio technology, e.g. the transmitter 38/32 taking the form of an RF tag and the corresponding receiver 32' of the mobile device 8 being configured to energize the RF tag 32 and receive the relevant signal back from the tag as a result.

In another example, the second channel may again be a coded light channel embedded into the light emitted by a luminaire. In this case the transmitter 38/32 takes the form of a light source of the respective luminaire, and the corresponding receiver 32' on the mobile device 8 takes the form of a coded light detector such as a photocell or camera plus associated signal processing software or circuitry.

As illustrated in FIG. 6, the transmitter 38/32 is preferably disposed at an entrance to the room, building or zone 2 in which the location network 4, 6 is installed. In the case of a stand-alone transmitter 38 separate from the anchor nodes 6, this could take the form of an RF tag located by the door (e.g. on the wall by the door), which the mobile device 8 can read by swiping or touching against it upon entering the room, building or zone. Alternatively the transmitter 38 could take the form of a luminaire or dedicated communication light (e.g. an LED) disposed near the door, from which the mobile device 8 can read a coded light signal upon entering the room, building or zone. In the case of a transmitter 32 incorporated into one of the anchor nodes 6, this could be a nominated one of the anchor nodes 6 disposed at the entrance (e.g. by the door) in similar manner discussed in relation to the stand-alone transmitter 38, allowing the mobile device to swipe or touch the node 6 or receive coded light from its respective light source upon entry into the room, building or zone. Note also that although preferred, it is not essential that the transmitter 38/32 for this second channel is placed by the entrance. Alternatively it could be placed at a convenient landmark, meeting point or terminal where a user is likely to begin (for example) a route, tour, working day, or work or leisure session.

There are a number of possible uses of this second channel to support the vouching process (as opposed to being the means by which the vouching between the anchor nodes 6 is implemented, or as opposed to only being the means by which the vouching between the anchor nodes 6 is implemented). These embodiments apply in a device centric case where the mobile device receives the data from the second channel, or an assisted case where the location server receives the data from the second channel via a corresponding receiver on the mobile device.

A first example is to provide an initial list of trustworthy nodes 6. Without an additional mechanism, rogue anchors could potentially also be installed that advertise a rogue list of other rogue nodes, thus undermining the vouching process set out above. Therefore it may be desirable for the mobile device 8 to be able to differentiate the rogue list from the authentic list. To overcome this, in embodiments an initial list of authentic nodes 6 can be bootstrapped to the positioned device 8 using the "out-of-band" mechanism provided by the transmitter 38/32 (out-of-band in that it uses a different channel than the first, beaconing channel). For example this could be implemented by means of coded-light or an RFID tag, located at strategic positions within the indoor facility based on the layout (e.g. at the entrances). The out-of-band communicated anchor nodes list enables trust in other nodes that this set of authentic nodes advertises, thereby creating a chain-of-trust. I.e. when the mobile device 8 first enters the environment (or first begins localization) it reads the initial list from the out-of-band transmitter 38/32 and only uses anchor nodes 6 known to be trusted from this initial list. From then onwards, if one of the nodes 6 on the initial list vouches for a further node 6 that was not on the initial list, the mobile device can then trust that further node for use in subsequent localizations, and so forth.

This out-of-band communicated list of anchor node identifiers can also be used after the initial bootstrapping to cross-check the list being advertised presently by the beacon nodes. Hence these out-of-band mechanisms based on coded-light or RFID can be installed at different locations in the building and can be used when desired by the positioned device to get additional confidence in the beacon nodes being used for localization.

In another example, the "out-of-band" second channel (e.g. coded-light, RFID etc.) can alternatively or additionally be used to securely bootstrap other configuration parameters that it may be desired to securely convey to the mobile device in order to ensure true location. Such parameters could include for example which location network to use (e.g. the SSID of the Wi-Fi network to use) or the location server to use for a particular indoor facility. Such bootstrapping can be performed as in the previous embodiment by strategically placing the out-of-band mechanisms based on the indoor layout, e.g. at the entrances. This out-of-band mechanism can also be used to cross-check present parameters that are in use by having out-of-band mechanism installed at different locations in the building.

In another example, the "out-of-band" second channel (e.g. coded-light, RFID etc.) may alternatively or additionally be used to securely bootstrap or cross-check the current location.

The transmitter 38/32 (e.g. coded-light or RFID) advertises its own location and therefore the approximate current location of the mobile device 8, assuming the out-of-band mechanism (i.e. second channel) of the transmitter 38/32 is only able to communicate within a small pre-defined physical space (e.g. directly below or in the vicinity of the coded-light lamp, or touching against or swiping past the RFID tag). This true location can then be used by the location module 36 to bootstrap (for efficiency reasons) and/or to cross-check the location that is being calculated based on the signals from the beacon nodes.

In the case of bootstrapping the location, the mobile device 8 obtains the location of the transmitter 38/32 via the second channel, which provides an approximate position of the mobile device 8 due to the nature of the second channel. The location module 36 takes this as an initial location fix, then continue to track the location based on the localization performed using the anchor nodes 6. This can increase the efficiency of the localization, as the there is no need to wait for the initial location fix to be calculated from the anchor nodes 6 based on the triangulation, trilateration, fingerprinting or the like (otherwise starting from a "cold start", the first fix takes additional time).

In the case of verifying the location calculation, the mobile device 8 again obtains the location of the transmitter 38/32 via the second channel, but in this case at some later time after the first localization; and the location module 36 takes this as an approximate "true" location of the mobile device 8. The location module 36 can then compare the true location reported by the out-of-band transmitter 38/32 over the second channel with the result of the localization it has performed based on the beacon signals from the anchor nodes 6 received over first channel based, and thereby determine whether consistent with the location of node reported on second channel. If not, this determination could be used to update or recalibrate the location calculation; or could be taken by the security module 34 as another indication that rogue nodes may be present.

Another possible application of the "out-of-band" second channel is where the security module 34 triggers an alert to about the observance or suspicion of rogue nodes based on one or more of the above techniques. The alert will be sent to a location server or to another administrative entity of the location network 6, but this requires knowledge of how to contact such a trusted entity (e.g. an address or other ID). The nodes 6 could be preconfigured with, but if not, another possible way to transfer this knowledge can be using the "out-of-band mechanism 38/32 (i.e. second channel) described above (e.g. RFID tag or coded light).

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first wireless node for use in a network of wireless nodes, for performing a localization to determine a location of a mobile device based on respective beacon signals transmitted wirelessly between the mobile device and each of a plurality of the wireless nodes; the first wireless node being configured to:
    wirelessly transmit or receive, over a first channel of the network, the respective beacon signal for use in determining the location of the mobile device; and
    wirelessly transmit information vouching for one or more others of the wireless nodes as being trusted for use in said localization, over a second channel of the network, where the second channel is different than the first channel, said information being transmitted to a device performing the localization for use in identifying one or more rogue versions of said wireless nodes.

2. The first wireless node of claim 1, comprising a first interface configured to transmit or receive the respective beacon signal on the first channel, and a second interface configured to transmit said information vouching for the other wireless nodes on the second channel; wherein:
    the second channel is on a different frequency than the first channel,
    the second channel uses a different radio access technology than the first channel,
    the second channel uses a different physical medium than the first channel,
    the second channel requires a line-of-sight while the first channel does not, and/or
    the second channel has a substantially shorter range than the first channel.

3. The first wireless node of claim 2, wherein the first channel is a radio channel.

4. The first wireless node of claim 2, wherein at least the first node is incorporated with a respective luminaire and the second channel uses coded light embedded in illumination emitted by the luminaire.

5. The first wireless node of claim 2, wherein the second channel uses a near-field radio technology.

6. The first wireless node of claim 2, wherein the device performing the localization is the mobile device, or the device performing the localization is a location server that receives said information via the mobile device; and, as well as transmitting said information vouching for the one or more other nodes, the first wireless node is further configured to use the second channel to additionally transmit to the mobile device:
an identifier of the network to be used to perform the localization; and/or
a location of the first wireless node, for verifying said localization, or for obtaining an initial fix of the mobile devices' location before continuing to track the mobile device's location based on said localization.

7. The first wireless node of claim 1, wherein the first wireless node is configured to transmit said information on a same wireless channel as used to transmit or receive the respective beacon signal.

8. The first wireless node of claim 7, wherein:
the first wireless node comprises a first interface configured to transmit or receive the respective beacon signal on a first wireless channel, the information vouching for the one or more other nodes also being transmitted on the first channel;
said information is transmitted by the first wireless node in a form encrypted or signed with a digital signature;
the first wireless node comprises a second interface configured to transmit, over a second channel, a public key for decrypting the encryption or a certificate for verifying the digital signature, wherein the second channel is on a different frequency than the first channel, uses a different radio access technology than the first channel, uses a different physical medium than the first channel, requires a line-of-sight while the first channel does not, and/or has a substantially shorter range than the first channel.

9. The first wireless node of claim 1, wherein said information vouches for only subset of the wireless nodes, the subset consisting of those of the wireless nodes that are trusted by the first wireless node and within a predetermined proximity of said first wireless node.

10. The first wireless node of claim 9, wherein the subset comprises only those of the wireless nodes that are trusted and within a predetermined proximity along a predicted navigation path of the mobile device.

11. The first wireless node of claim 1, wherein the device performing the localization is the mobile device which receives said information via a receiver of the mobile device, or the device performing the localization is a location server which receives said information via a second one of said wireless nodes, or via the mobile device.

12. The first wireless node of claim 1, wherein the second channel requires a line-of-sight for transmission of said information vouching for the one or more others of the wireless nodes on the second channel.

13. A mobile device for use in a network of wireless nodes, for performing a localization to determine a location of the mobile device based on respective beacon signals transmitted wirelessly between the mobile device and each of a plurality of the wireless nodes; the mobile device comprising:
one or more wireless interfaces configured to wirelessly transmit or receive over a first channel of the network the respective beacon signals for use in determining the location of the mobile device, and to wirelessly receive information over a second channel of the network from a first one of the wireless nodes vouching for one or more others of the wireless nodes as being trusted for use in said localization, where the first channel is different than the second channel;
a location module configured to perform said localization; and a security module configured to identify one or more rogue versions of said wireless nodes based on said information.

14. The mobile device of claim 13, wherein the security module is configured to:
exclude the identified rogue nodes from use in said localization, or give the signals from the identified rogue nodes a lower weighting in said localization relative to the vouched-for nodes.

15. The mobile device of claim 13, wherein the security module is configured to report the identified rogue nodes to a location server or administrative entity.

16. A system comprising:
a network of wireless nodes, for performing a localization to determine a location of a mobile device based on respective beacon signals transmitted wirelessly over a first channel of the network between the mobile device and each of a plurality of the wireless nodes; and
the mobile device and/or a location server;
wherein each of the wireless nodes is configured to wirelessly transmit over a second channel of the network different from the first channel a respective report vouching for one or more others of the wireless nodes as being trusted for use in said localization;
wherein the mobile device is configured to receive one or more of said reports, or the location server is configured to receive one or more of said reports via at least one receiving one of said wireless nodes or via the mobile device; and
wherein the mobile device or location server comprises a location module configured to perform said localization, and a security module configured to identify one or more rogue versions of said wireless nodes based on one or more of said reports.

17. The system of claim 16, wherein:
the system comprises a transmitter configured to transmit, to the mobile device over the second channel, an initial report vouching for an initial group of said wireless nodes, wherein the second channel is on a different frequency than the first channel, uses a different radio access technology than the first channel, uses a different physical medium than the first channel, requires a line-of-sight while the first channel does not, and/or has a substantially shorter range than the first channel;
the location module is comprised in the mobile device and the mobile device receives the initial report, or the location module is comprised in the location server and the location server receives the initial report via the mobile device; and
the location module is configured to perform one or more instances of said localization including at least a first instance, the first instance of the localization being performed based only on the respective beacon signals of ones of those wireless nodes vouched for in said initial report.

18. The system of claim 17, wherein the transmitter is placed at an entry point to a room, building or zone in which said wireless nodes are disposed, the transmitter being arranged to transmit said initial report and/or a certificate or a public key over the second channel to the mobile device upon passing said entry point.

19. The system of claim 16, wherein:
    each of the wireless nodes is configured to transmit or receive the respective beacon signal on the first wireless channel, and the respective reports are also transmitted on the first channel;
    the respective reports are transmitted by each of the wireless nodes in a form encrypted or signed with a digital signature; and
    the system comprises a transmitter configured to transmit, to the mobile device over the second channel, a public key for decrypting the encryption or a certificate for verifying the digital signature, wherein the second channel is on a different frequency than the first channel, uses a different radio access technology than the first channel, uses a different physical medium than the first channel, requires a line-of-sight while the first channel does not, and/or has a substantially shorter range than the first channel;
    the security module is comprised in the mobile device and the mobile device receives said public key or certificate, or the security module is comprised in the location server and the location server receives the public key or certificate via the mobile device; and
    the security module is configured to use the received public key to decrypt the encryption, or to use the received certificate to verify the digital signature.

20. A computer program product for performing a localization to determine a location of a mobile device based on measurements of a respective beacon signal transmitted wirelessly over a first channel of a network between the mobile device and each of a plurality of the wireless nodes in the network of wireless nodes; the computer-program product comprising code embodied on at least one non-transitory computer-readable medium, and configured so as when retrieved and/or downloaded and executed on one or more processors to perform operations of:
    receiving information from a first one or the wireless nodes over a second channel of the network vouching for one or more others of the wireless nodes as being trusted for use in said localization; performing said localization; and
    identifying one or more rogue versions of said wireless nodes based on said information.

* * * * *